(12) United States Patent
Koch et al.

(10) Patent No.: US 9,610,720 B2
(45) Date of Patent: Apr. 4, 2017

(54) INJECTION-MOLDING STATION FOR THE MANUFACTURE OF MULTILAYER PREFORMS

(71) Applicant: HPT Hochwertige Pharmatechnik GmbH & Co. KG, Neuhaus am Rennweg (DE)

(72) Inventors: Michael Koch, Ilmenau (DE); Marko Türk, Bermbach (DE); Lutz Treuner, Steinbach am Wald (DE)

(73) Assignee: HPT Hochwertige Pharmatechnik GMBH & Co. KG, Neuhaus am Rennweg (DE)

( * ) Notice: Subject to any disclaimer, the term of this patent is extended or adjusted under 35 U.S.C. 154(b) by 36 days.

(21) Appl. No.: 14/668,629

(22) Filed: Mar. 25, 2015

(65) Prior Publication Data
US 2015/0273746 A1  Oct. 1, 2015

(30) Foreign Application Priority Data
Mar. 25, 2014 (DE) .................. 10 2014 004 221

(51) Int. Cl.
*B29C 45/16* (2006.01)
*B29C 45/23* (2006.01)
(Continued)

(52) U.S. Cl.
CPC .......... *B29C 45/1684* (2013.01); *B29B 11/08* (2013.01); *B29C 45/1603* (2013.01);
(Continued)

(58) Field of Classification Search
CPC ... B29C 45/23; B29C 45/231; B29C 45/1603; B29C 45/161; B29C 2045/1612
See application file for complete search history.

(56) References Cited

U.S. PATENT DOCUMENTS

| 4,904,509 A | 2/1990 | Nohara et al. |
| 5,972,258 A | 10/1999 | Sicilia |

(Continued)

FOREIGN PATENT DOCUMENTS

| DE | 4021856 A1 | 1/1991 |
| DE | 3049725 C2 | 7/1993 |

(Continued)

OTHER PUBLICATIONS

Extended European search report including the European search opinion issued for corresponding European Patent Application No. EP15000793.8 dated Jul. 15, 2015.

*Primary Examiner* — Ryan Ochylski
(74) *Attorney, Agent, or Firm* — Myers Wolin LLC

(57) ABSTRACT

An injection-molding station for the manufacture of multi-layer preforms comprises an injection-molding machine (2), at least one multi-component nozzle (3), at least two melt accumulators (4, 5) constructed as cylinder accumulators and connected thereto, at least two plasticizer units (6, 7) for charging them and a control unit (8). The multi-component nozzle has slides (17, 19), which are associated with the melt channels (9, 10) and which are separately activated by the control unit independently of one another in such a way that the respective melt channels have an infinitely variable passage cross section. Proportional actuators (26, 27) that can be activated by the control unit are associated with the pistons (22, 23) of the cylinder accumulators. The control unit comprises a memory unit for coordinated movement or position profiles of the at least two closing slides and the at least two melt-accumulator pistons.

13 Claims, 5 Drawing Sheets

(51) Int. Cl.
*B29B 11/08* (2006.01)
*B29C 45/53* (2006.01)
*B29C 45/18* (2006.01)
*B29C 45/80* (2006.01)
*B29K 105/00* (2006.01)
*B29C 49/06* (2006.01)
*B29C 49/22* (2006.01)
*B29K 101/12* (2006.01)
*B29L 9/00* (2006.01)
*B29L 31/00* (2006.01)

(52) U.S. Cl.
CPC .......... *B29C 45/1866* (2013.01); *B29C 45/23* (2013.01); *B29C 45/53* (2013.01); *B29C 45/80* (2013.01); *B29C 49/06* (2013.01); *B29C 49/221* (2013.01); *B29C 2045/161* (2013.01); *B29C 2945/76568* (2013.01); *B29C 2945/76755* (2013.01); *B29K 2101/12* (2013.01); *B29K 2105/258* (2013.01); *B29L 2009/00* (2013.01); *B29L 2031/712* (2013.01)

(56) References Cited

U.S. PATENT DOCUMENTS

| | | |
|---|---|---|
| 6,129,960 A | 10/2000 | Kudert et al. |
| 6,152,721 A | 11/2000 | Schad et al. |
| 6,276,914 B1 | 8/2001 | Sicilia |
| 6,344,249 B1 | 2/2002 | Maruyama et al. |
| 7,419,625 B2 | 9/2008 | Vasapoli et al. |
| 8,518,504 B2 | 8/2013 | Abe et al. |
| 2012/0276235 A1 | 11/2012 | Belzile et al. |

FOREIGN PATENT DOCUMENTS

| | | |
|---|---|---|
| DE | 69411641 T2 | 12/1998 |
| DE | 19848818 A1 | 4/1999 |
| JP | 2004098666 A | 4/2004 |
| JP | 4104022 B2 | 6/2008 |
| WO | 8903756 A1 | 5/1989 |
| WO | 2011006999 A1 | 1/2011 |
| WO | 2013000044 A2 | 1/2013 |

INJECTION-MOLDING STATION FOR THE MANUFACTURE OF MULTILAYER PREFORMS

CROSS REFERENCE TO RELATED APPLICATIONS

This application claims priority under 35 USC §119 to German Application No. 10 2014 004 221.9, filed Mar. 25, 2014, the contents of which are incorporated by reference herein.

FIELD OF THE INVENTION

The present invention relates to an injection-molding station for the manufacture of multilayer preforms.

BACKGROUND

Various methods are known for the manufacture of hollow plastic articles (e.g. bottles, cans and other containers). In a first group of such methods, known as extrusion blow-molding, the individual hollow articles are manufactured from a thermoplastic tube, which is drawn to length and blown in a mold. In another group of such methods, a preform is blown, but in this case blowing takes place in a cavity that defines the final shape of the hollow article in question. This group of methods, to which the present invention relates, includes injection blow-molding as well as stretch blow-molding, the preform being mechanically stretched before it is blown in the case of stretch blow-molding.

Multilayer preforms are used to manufacture high-grade hollow plastic articles having a multilayer structure. The hollow multilayer plastic articles manufactured from multilayer preforms are characterized by increased functionality, for example by the fact that a first layer of the will of the hollow article is optimized with respect to mechanical strength, while a second layer is optimized with respect to chemical resistance to the intended contents of the hollow article and/or with respect to the surface quality, i.e. low porosity.

Extensive proposals for the manufacture of multilayer preforms have indeed been published (for example, see DE 3049725 C2, WO 8903756 A1, JP 4104022 B2, WO 2011006999 A1, WO 2013000044 A2, U.S. Pat. No. 4,904,509 A, U.S. Pat. No. 8,518,504 B2, U.S. Pat. No. 5,972,258 A, U.S. Pat. No. 6,276,914 B1, U.S. Pat. No. 6,344,249 B1). Nevertheless, the manufacture of particularly high-grade hollow multilayer plastic articles from multilayer preforms continues to be a technical challenge, which has not yet been solved satisfactorily. This is due among other aspects to the fact that the area of the material involved in the forming of the multilayer (preform into the hollow multilayer plastic article—by blow-molding or stretch blow-molding methods—is expanded by a factor of 12 to 15. The wall thickness of the multilayer preform is therefore reduced to as little as one fifteenth of the original thickness during blow-molding. Considering the small wall thickness of the hollow plastic article (which is desirable from the viewpoint of weight of the hollow plastic article and of the material costs incurred for the manufacture thereof) and the inhomogeneity—which cannot be ruled out in the use of conventional technology to manufacture the preforms—of material distribution within the individual layers of the multilayer preforms, this may have the consequence that the individual layers within the hollow multilayer plastic article manufactured from these preforms is functionally deficient, in the sense that they do not satisfy their intended function.

SUMMARY

The object of the present invention is to remedy this problem. In particular, it is intended to create the conditions for manufacture of hollow multilayer plastic articles that have small wall thickness while meeting the highest quality requirements.

The foregoing object is achieved by the injection-molding station specified in the claims for the manufacture of multilayer preforms. The inventive injection-molding station is therefore characterized by the following features:

The injection-molding station comprises an injection-molding machine having at least one injection-molding cavity, at least one multi-component nozzle, at least two melt accumulators connected thereto, at least two plasticizer units for charging them and a control unit;

the multi-component nozzle is constructed as a shutoff nozzle with at least two melt channels disposed concentrically relative to one another; at least in portions, connected to the melt accumulators and merging with one another inside the multi-component nozzle and with two closing slides, which can be separately activated, associated therewith;

actuators that can be activated independently of one another by the control unit act on the slides in such a way that the melt channels respectively have an infinitely variable passage cross section;

the melt accumulators are constructed as cylinder accumulators with a proportional actuator that is associated with the respective piston and can be activated by the control unit;

the control unit comprises a memory unit for coordinated position or movement profiles of the at least two closing slides and the at least two melt-accumulator pistons.

By virtue of functionally synergetic interaction with one another, the features that define the inventive injection-molding station permit the manufacture of multilayer preforms in which the distribution of the individual components within the wall of the preform satisfies the most stringent requirements, i.e. in particular follows a predetermined distribution profile exactly. Even the particularly critical zone of a hollow multilayer article manufactured by blow-molding, namely the bottom, can be manufactured satisfactorily by application of the present invention; thus the bottom can be sealed by complete encapsulation with a barrier layer. In conjunction with the other features, it is particularly noteworthy in this connection that the melt channels merging with one another inside the multi-component nozzle are provided with individual closing slides, which can be separately activated by the control unit and by means of which the passage cross sections of the melt channels can be adjusted infinitely and independently on one another, while at the same time the melt prepared in the melt accumulators can be forced out therefrom in profile-controlled sequence by pistons, which can be moved by means of proportional actuators, which in turn can be activated independently of one another by the control unit. The speed of movement of the two pistons of the melt accumulators can be preset infinitely variably by means of the said proportional actuators. Both the positioning of the closing slides and the movement of the pistons of the melt accumulators then follow coordinated position or movement profiles coordinated with one another and resident in the control unit.

By the fact that the ideal distribution of the material within the individual layers of the wall is optimally maintained in the multilayer preform manufactured by using the inventive injection-molding station, the danger that defects (i.e. deviations of the hollow multilayer plastic article from the target dimensions of the individual layers) wilt occur during blow-molding or stretch blow-molding of the preform in question can be significantly reduced. Even material pairs (certain plastics approved for pharmaceutical applications) that cannot be processed satisfactorily to hollow articles with layer composite structure by use of conventional technology may be used for the manufacture of hollow multilayer articles by application of the present invention. As a result, hollow multi layer plastic articles that satisfy the most stringent requirements can be manufactured by using the present invention. In particular, multilayer plastic articles that are suitable for storing sensitive pharmaceuticals and that are superior even to containers made of glass as regards their properties relevant for practice can be manufactured. Specifically, by application of the present invention, it is possible to manufacture pharmaceutical containers with a surface having much smaller microporosities than glass, thus significantly reducing the danger of contamination of the surface by bacteria or other microorganisms. Furthermore, the danger of breakage of such multilayer plastic articles is many times smaller than in the case of glass containers. Ultimately, therefore, the present invention can contribute in particular to especially advantageous logistics for pharmaceuticals.

For improved economy, it is advantageous for the injection-molding machine to be constructed as a multi-cavity injection-molding machine, wherein each injection-molding cavity is provided with its own multi-component nozzle. In this improvement in the interests of an optimum result in the foregoing sense the multi-component melt stream exiting a multi-component nozzle is not distributed to two or more cavities, but instead one multi-component nozzle injects into precisely one cavity. In other words, just as many multi-component nozzles are provided as there are cavities in the multi-cavity injection-molding machine.

If several multi-component nozzles injecting into a multi-cavity injection-molding machine are provided in the sense of the foregoing improvement, the possibility must be considered—in the interests of reduced complexity of the apparatus and smaller overall size of the injection-molding station—of charging several multi-component nozzles from common melt accumulators. In this case it is particularly preferred to connect each melt accumulator to two multi-component nozzles. If the geometry of the multilayer preform to be manufactured is relatively simple, however, each inch accumulator may be connected to even more multi-component nozzles, namely to as many as eight, in order to charge them, i.e. their melt accumulators, synchronously. Another possibility for reducing the complexity of the apparatus is to use a single common drive to actuate, in parallel, the pistons of several melt accumulators, with each of which one multi-component nozzle or else several multi-component nozzles can be associated.

Particularly good results can be achieved when the actuators associated with the closing slides respectively comprise a differential mechanism. Such differential mechanisms—conjunction with relatively compact design—permit highly precise positioning of the closing slides, and so the passage cross sections of the melt channels can be adjusted accordingly with the highest precision in keeping with the preset profile.

According to yet another preferred improvement of the present invention, at least one of the entry apertures through which melt from the melt accumulators passes into the melt channels is disposed close to the confluence of the melt channels. The length of the melt channels in question from the entry aperture to the confluence of the melt channels is restricted in this case to that size necessary for homogeneous distribution of the melt in the melt channel in question at its confluence with the at least one further melt channel. In this way a relatively stiff hydraulic system is obtained, which is favorable to accuracy of production of the manufactured multilayer preforms. In other respects, it is particularly preferable for the confluence of the at least two melt channels to be located just immediately upstream from the mouth of the multi-component nozzle or even just in the region of the mouth, possibly just in the mouth itself. In this case, therefore, the melt streams are supplied separately as far as a position directly upstream from the mouth or into the region of the mouth or into the mouth of the multi-component nozzle. Preferably the (infinitely variable) minimum passage cross sections of the melt channels are also disposed directly upstream from the mouth of the multi-component nozzle or in the mouth region itself.

As regards the melt accumulators, they (preferably comprise respectively a reducing sleeve, which is inserted in the housing of the melt accumulator and in which the piston of the melt accumulator in question is sealingly guided. The cross section of the melt chamber of the melt accumulator can be modified by choosing a reducing sleeve/piston pair suitable for the respective use. Typically this is chosen such that it is only marginally larger than the melt volume needed for the shot in question. In this way almost the entire stroke of the piston of the melt accumulator in question is needed for the shot in question. This is positive from the viewpoint of exact dosing and thus ultimately also from that of accuracy of production of the preform to be manufactured.

According to yet another preferred improvement, the drives of the plasticizing units, the actuators of the closing slides and the proportional actuators of the melt-accumulator pistons are of electromechanical construction. This permits the use of the inventive technology in clean-room applications, which are needed in particular for the manufacture of containers for sensitive pharmaceutical products.

The closing slides of the multi-component nozzle are preferably constructed as shutoff needles disposed concentrically relative to one another, wherein a first of the shutoff needles is constructed as a hollow needle. The variable passage cross section of a first melt channel is disposed between this hollow needle and the nozzle housing and the variable passage cross section of a second melt channel is disposed between the hollow needle and the second shutoff needle disposed inside this. In this case it is particularly advantageous for both the outside and inside of the hollow needle in the vicinity of the nozzle mouth to taper toward the mouth. This permits a selective influence to be exerted on the passage cross sections of the melt channels, thus favoring the accuracy of dosing of the melt streams that is particularly important for the present invention. Against the same background, and also in the interests of special homogeneity of the melt flow, the shutoff needle disposed inside the hollow needle also tapers toward the nozzle mouth, where it ends substantially as a sharp point. Particularly preferably, the outside contour of the hollow needle in the vicinity of the mouth corresponds to the inside contour of the nozzle housing, in the sense that the hollow needle is in surface contact with the inside of the nozzle housing when it is in a position shutting off the first melt channel. Analogously, the outside contour of the shutoff needle disposed in the hollow needle preferably corresponds, in the vicinity of the mouth, to the inside contour of the hollow needle, in the sense that the shutoff needle is in surface contact with the inside of the hollow needle when it is in a position shutting off the second melt channel.

Preferably, according to yet another advantageous improvement of the invention, the melt accumulators are thermally decoupled from one another, especially by the fact that they are constructed as two separate components not directly joined to one another. Hereby the thermal profile of the various melts can be influenced independently of one another, so that these may be conditioned optimally.

The coordinated position or movement profiles, resident in the memory unit of the control unit, of the at least two closing slides and of the at least two melt-accumulator pistons are constructed particularly preferably as time-position-movement profiles, which are completely independent of the melt pressure (inside the melt accumulators and/or the melt channels). Accordingly, the closure slides and the melt-accumulator pistons are controlled exclusively by time during a working cycle, without any allowance for the melt pressure in the system.

The present invention may be used particularly advantageously when the multilayer preforms manufactured by means of the inventive injection-molding station are further processed directly. In this sense the present invention is implemented particularly preferably in an injection blow-molding machine used for the manufacture of hollow articles having a multilayer wall structure, wherein the injection blow-molding machine comprises an injection-molding station constructed according to the invention explained in the foregoing, a transfer unit and a blowing station with a blow-molding machine having at least one blowing cavity as well as a blowing-gas source. In this form of the implementation of the present invention, the heat of the preform is used for the ensuing blow-molding process, as is favorable for efficiency among other viewpoints. Of course, this in no way represents the sole option for practical implementation of the present invention. To the contrary, it is also advantageously possible with the inventive injection-molding station to manufacture such multilayer preforms that will be further processed in a decoupled second process.

Multilayer preforms can also be manufactured successfully from different material pairs by using the inventive injection-molding station. Preferred material pairs are COP-PA, COP-EVOH, PET-PA and PET-EVOH.

BRIEF DESCRIPTION OF THE DRAWINGS

The present invention will be explained in more detail hereinafter on the basis of the preferred exemplary embodiments illustrated in the drawing, wherein.

DETAILED DESCRIPTION OF THE PREFERRED EMBODIMENTS

Figure 1:
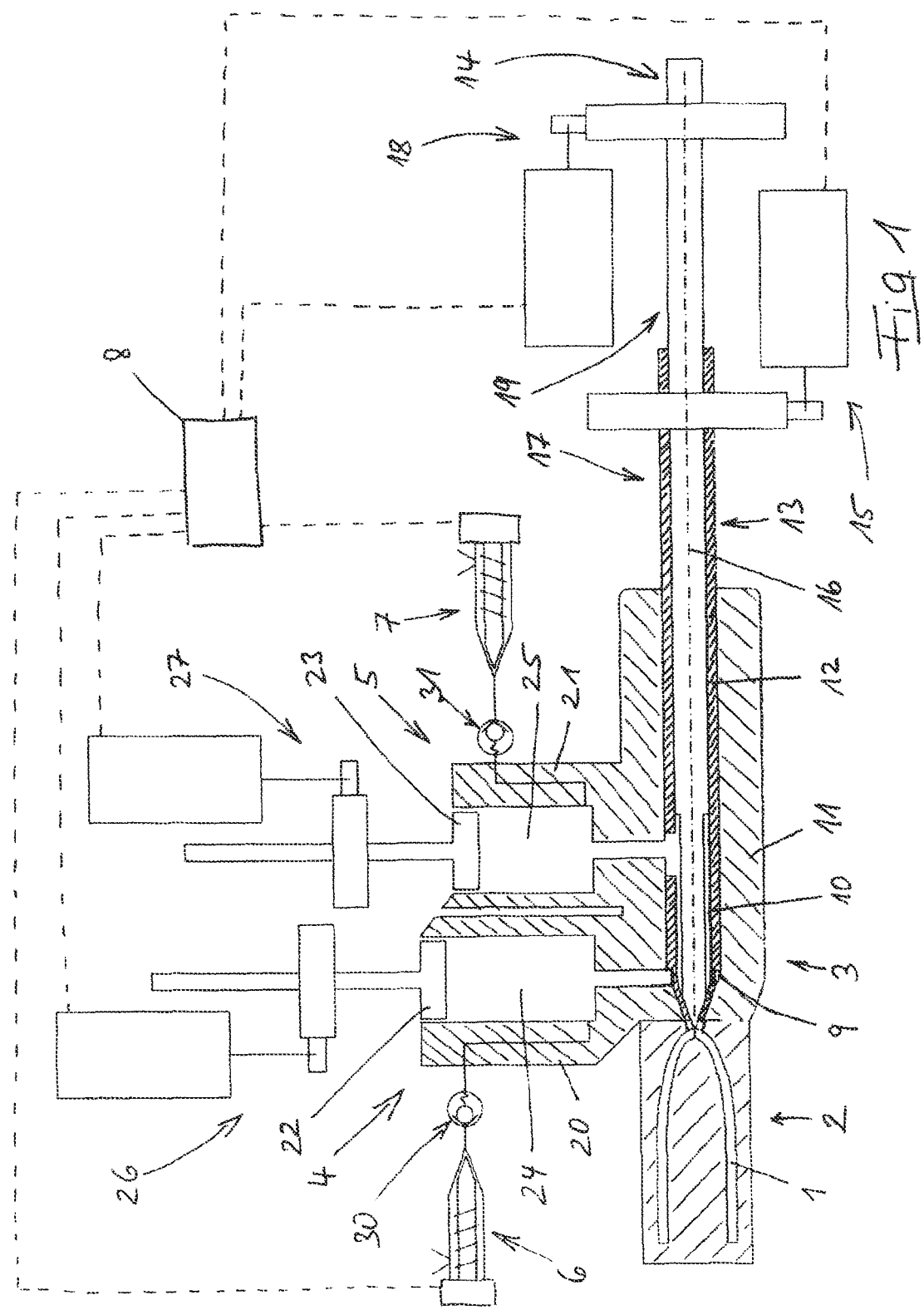
FIG. 1 schematically illustrates basic structures of an injection-molding station, constructed according to the invention, for two components.

The injection-molding station, shown schematically in FIG. 1, for the manufacture of multilayer preforms comprises an injection-molding machine 2, known in itself and having an injection-molding cavity 1, a multi-component nozzle 3 that can be mounted thereon, two melt accumulators 4, 5 connected thereto, two plasticizing units 6, 7 charging the latter and a control unit 8. Multi-component nozzle 3 is constructed as a shutoff nozzle. It has a first melt channel 9 connected to first melt accumulator 4 and having an annular cross section and a second melt channel 10 connected to second melt accumulator 5, also having an annular cross section and being disposed concentrically relative to first melt channel 9. This first melt channel 9 is bounded on the outside by housing 11 of multi-component nozzle 3 and on the inside by a first shutoff needle 13 constructed as a hollow needle 12. In contrast, second melt channel 10 is bounded on the outside by hollow needle 12 and on the inside by second shutoff needle 14, which is disposed concentrically relative thereto.

First shutoff needle 13 (hollow needle 12) forms a first closing slide 17, which can be displaced along its axis 16 by means of a first actuator 15. Second shutoff needle 14 forms a second closing slide 19, which can be displaced along its axis 16 by means of a second actuator 18. Actuators 15 and 18 acting on the two closing slides 17 and 19 can be activated independently of one another by control units 8 in such a way that infinitely variable passage cross sections can be adjusted adjacent to the mouth of both melt channels 9 and 10. The variable passage cross section of first melt channel 9 is then disposed, in the vicinity of the mouth, between hollow needle 12 and housing 11 of the multi-component nozzle, and the variable passage cross section of second melt channel 10 is then disposed, in the vicinity of the mouth, between hollow needle 12 and second shutoff needle 14 disposed inside this.

First and second melt accumulators 4 and 5 are constructed as cylinder accumulators. They comprise a cylinder housing 20 and 21 respectively and an associated piston 22 and 23 respectively, which together bound a first melt chamber 24 and a second melt chamber 25 respectively. Piston 22 of first melt accumulator 4 can be moved by means of associated proportional actuator 26, which can be activated by control unit 8. Analogously, piston 23 of second melt accumulator 5 can be moved by means of associated proportional actuator 27, which can be activated by control unit 8. For injection-molding of a preform, melt is forced by profile-controlled movement of piston 22 or 23 respectively in the sense of making first melt chamber 24 and second melt chamber 25 smaller, i.e. because a first component enters first melt channel 9 and a second component enters melt channel 10, and from there through the passage cross sections associated with the melt channels and variable in profile-controlled sequence into injection-molding cavity 1 of injection-molding machine 2. The adjustment of closing slides 17 and 19 as well as the movement of pistons 22 and 23 of melt accumulators 4 and 5 by means of the associated actuators is applied by the control unit in a manner that is purely time-controlled in response to coordinated position and movement profiles.

Melt is injected into melt accumulators 4 and 5 from associated plasticizer units 6 and 7 respectively. Valves 30 and 31 respectively, which are closed during injection of melt into injection-molding cavity 1, are disposed between these plasticizer units 6 and 7 respectively and melt accumulators 4 and 5 respectively associated therewith. After injection has taken place, and while pistons 22 and 23 are being retracted, melt accumulators 4 and 5 are refilled with melt from plasticizer units 6 and 7, for which purpose valves 30 and 31 are opened. During the (re)filling of melt accumulators 4 and 5, the two melt channels 9 and 10 are completely closed in the region of the respective variable passage cross section.

To shorten the distance from the melt-entry aperture in second melt channel 10 to the nozzle mouth, where the two melt channels 9 and merge, the two melt accumulators 4 and 5 (instead of being disposed in series as schematically illustrated) may also be disposed more or less opposite one another.

The structure of the embodiment illustrated in FIGS. 2 to 5 can be explained largely on the basis of the foregoing descriptions of FIG. 1. Reference to them is made here, in order to avoid repetition. In addition, the reference symbols already cited in FIG. 1 are used in FIGS. 2 to 5 to denote identical structural parts or components.

Figure 2:
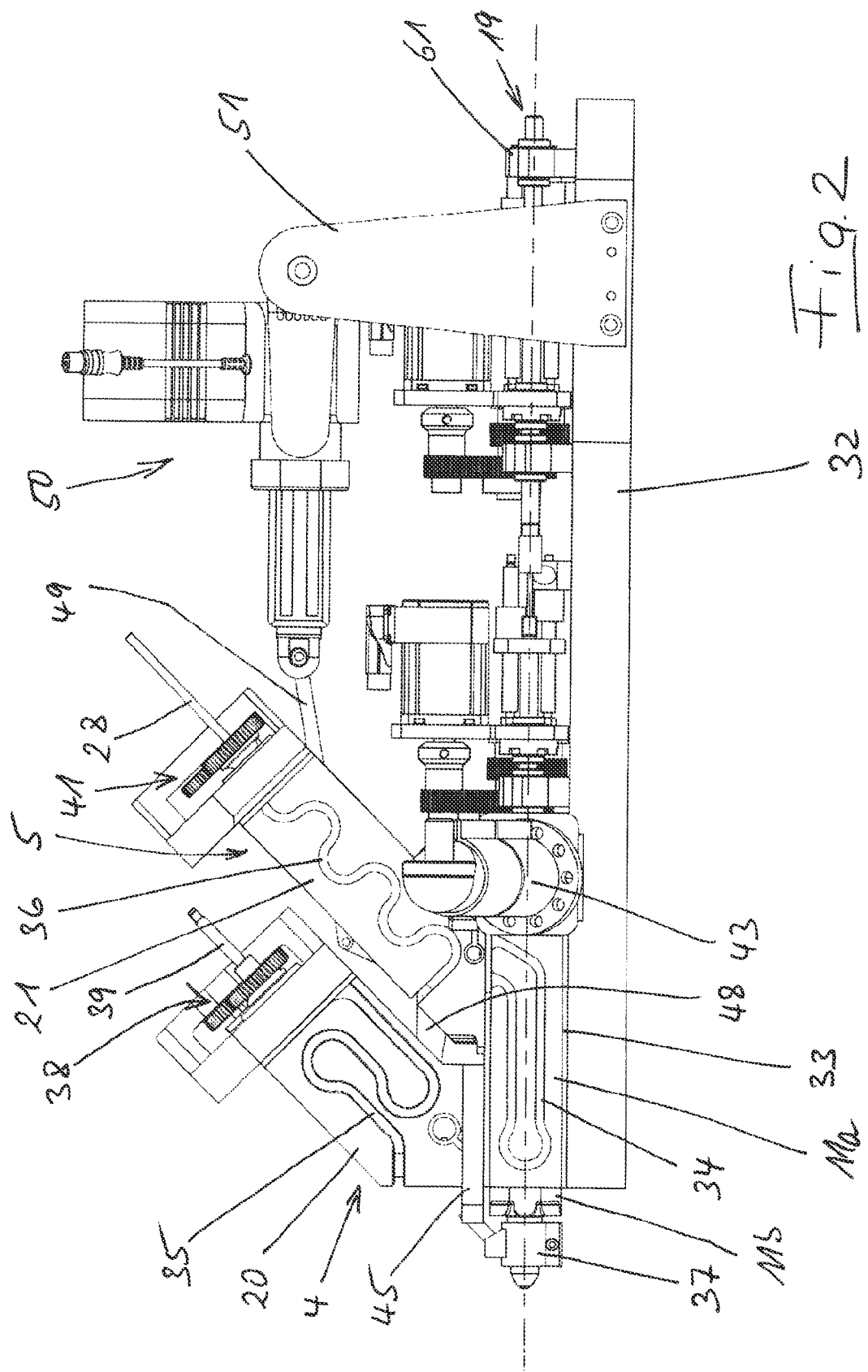
FIG. 2 shows a side view of a structural implementation of an injection-molding station constructed according to the invention and used for synchronous manufacture of two preforms.
Figure 3:
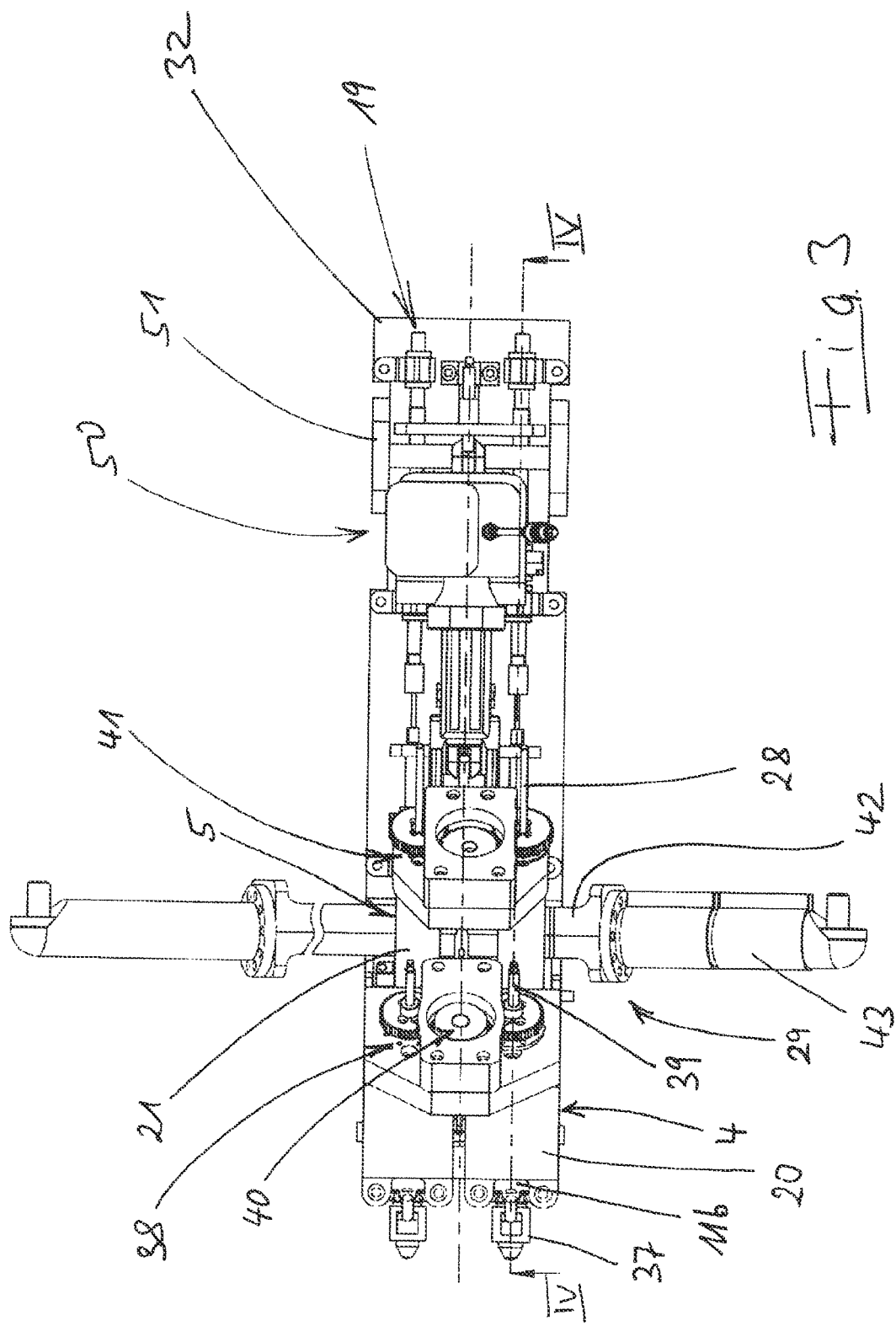
FIG. 3 shows an overhead view of the injection-molding station according to FIG. 2.

According to FIGS. 2 to 5, the entire system used for synchronous manufacture of two multilayer preforms is mounted on abuse plate 32. Especially bases 11a—respectively surrounded by insulation 13—of housings 11 of the two multi-component nozzles 3 are mounted on this. FIG. 2 shows a heating coil 34, by means of which the temperature of housing 11 can be controlled, mounted on base 11a of housing 11 of multi-component nozzle 3 on the observer's side. Further heating coils 35 and 36 are mounted on cylinder housings 20 and 21 of the (total of four) melt accumulators 4 and 5, so that their temperature can also be controlled. And mouth parts 11b of housing 11, flanged onto the front side of bases 11a of housings 11 of multi-component nozzles 3, are respectively surrounded by a heating mantle 37.

Pistons 22 of the two first melt accumulators 4 are synchronized by means of a distributing mechanism 38, which acts in parallel on the two spindles 39 driving pistons 22 and onto the input 40 of a stepping motor—not illustrated—can be flanged. The situation is analogous for the synchronized drive of the pistons of the two second melt accumulators 5—which are thermally decoupled from the two first melt accumulators 4—via distributing mechanism 41, which acts on the two spindles 28.

To charge the two first melt accumulators 4 and the two second melt accumulators 5 with melt (first component or second component) from a first plasticizer unit or a second plasticizer unit, a feed and distributing unit 29 is used. This comprises a middle piece 42, which is flanged onto the rear of housings 11 of the two multi-component nozzles, and two heated feeders 43 mounted on the sides thereof. The latter can be coupled with the two—not illustrated—plasticizer units; and distribution of the first and second melts injected into middle piece 42 takes place therein to filling channels, which are routed in bases 11a of housings 11 and discharge at corresponding apertures of injection ports 44 of the two first melt accumulators 4 and of the two second melt accumulators 5. Since the two first melt accumulators 4 are respectively mounted by means of an intermediate plate 45 on bases 11a of housings 11 of associated multi-component nozzles 3, connecting channels 46 provided in intermediate plates 45 respectively establish communication between the filling channels present in housings 11 and injection ports 44.

Valves 30 and 31 respectively (see FIG. 1) provided in injection ports 44 are constructed as rotary slide valves in the embodiment according to FIGS. 2 to 5. Rotary slide valves 47 associated with the two first melt accumulators 4 and the rotary slide valves associated with the two second melt accumulators 5 are coupled via a coupling rod 48 in such a way that they are opened and closed simultaneously. Drive rod 49, which itself is actuated by a positioning motor 50, acts on coupling rod 48. The positioning motor is mounted by means of brackets 51 on base plate 32.

Via a pressure channel 52, which passes in several sections 52a, 52b, 52c and 52d through cylinder housing 20, intermediate plate 45, base 11a of housing lit as well as its mouth part 11b, melt chamber 24 of each first melt accumulator 4 is in communication with first melt channel 9. By analogy, melt chambers 25 of the two second melt accumulators 5 are in communication, via a respective pressure channel 53, with second melt channel 10 in question.

Figure 5:
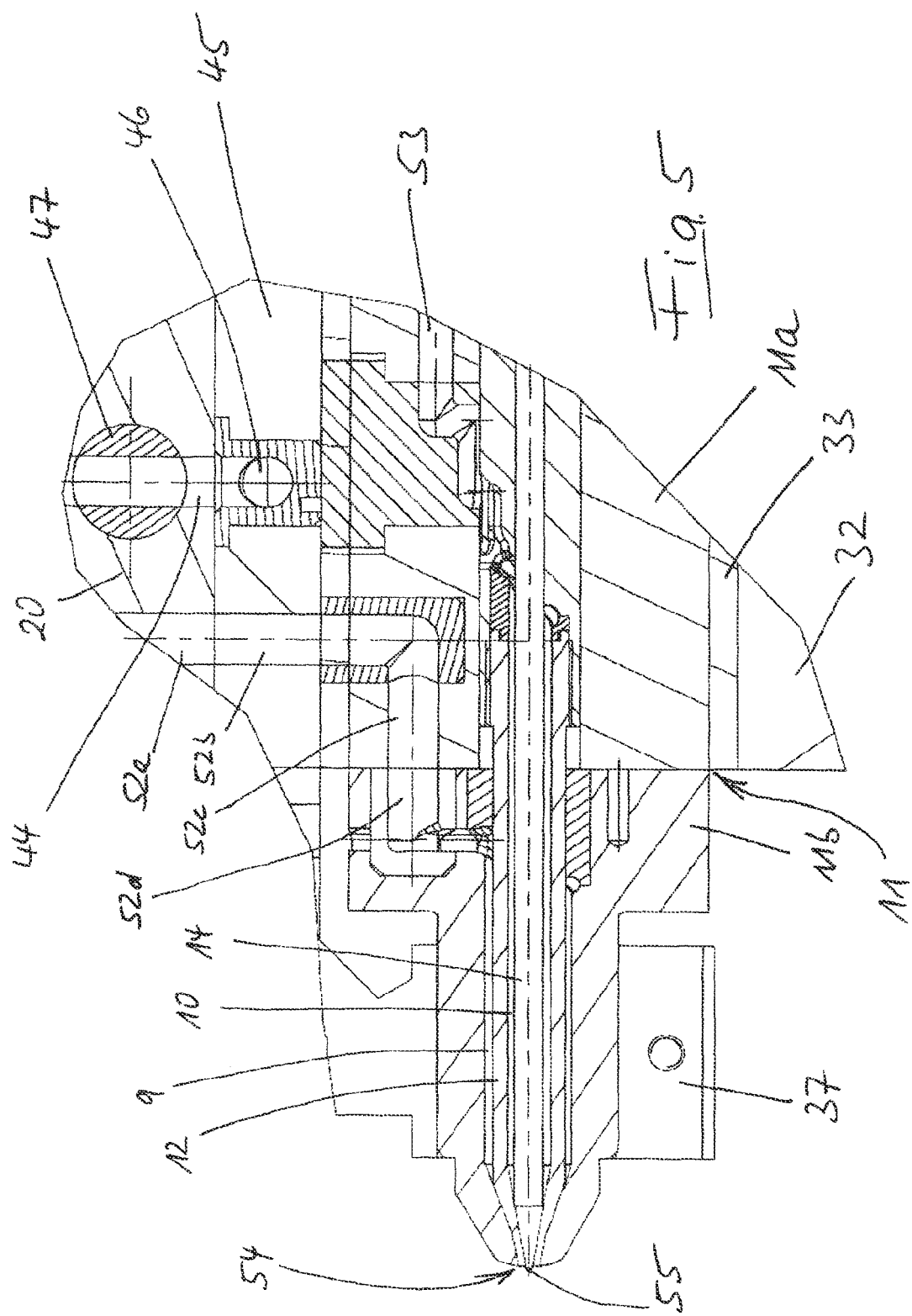
FIG. 5 shows an enlarged detail from FIG. 4.

As is shown in particular in FIG. 5, both the outside and inside respectively of hollow needle 12 in the vicinity of nozzle mouth 54 taper toward this. The outside contour of hollow needle 12 is then adapted to the inside contour of housing 11 of multi-component nozzle 3 in the vicinity of the mouth in such a way that hollow needle 12 is in surface contact with the inside of housing lit of multi-component nozzle 3 when it is in the position that shuts off first melt channel 9. Likewise shutoff needle 14 disposed inside hollow needle 12 tapers toward nozzle mouth 54 and ends substantially as a sharp point 55. The outside contour of this shutoff needle 14 is adapted to the inside contour of hollow needle 12 so that shutoff needle 14 is in surface contact with the inside of hollow needle 12 when it is in the position that shuts off second melt channel 10. The confluence of first melt channel 9 and second melt channel 10 is located just at mouth 54 of multi-component nozzle 3. By the fact that the variable passage cross sections of the two melt channels 9 and 10 extend to a position directly at mouth 54 in this embodiment, they represent virtually infinitely variable outlet cross sections of the melt channels.

Actuator 15 provided for common actuation of hollow needles 12—coupled via a coupling plate 56—of the two multi-component nozzles 3 comprises a stepping motor 57 and a differential mechanism 58. Bearing blocks 59 are used for displaceable bearing of hollow needles 12. Analogously, shutoff needles 14—coupled via a coupling plate 60 and guided displaceably in bearing blocks 61—disposed inside hollow needles 12 can be actuated by means of a common actuator 18.

Figure 4:
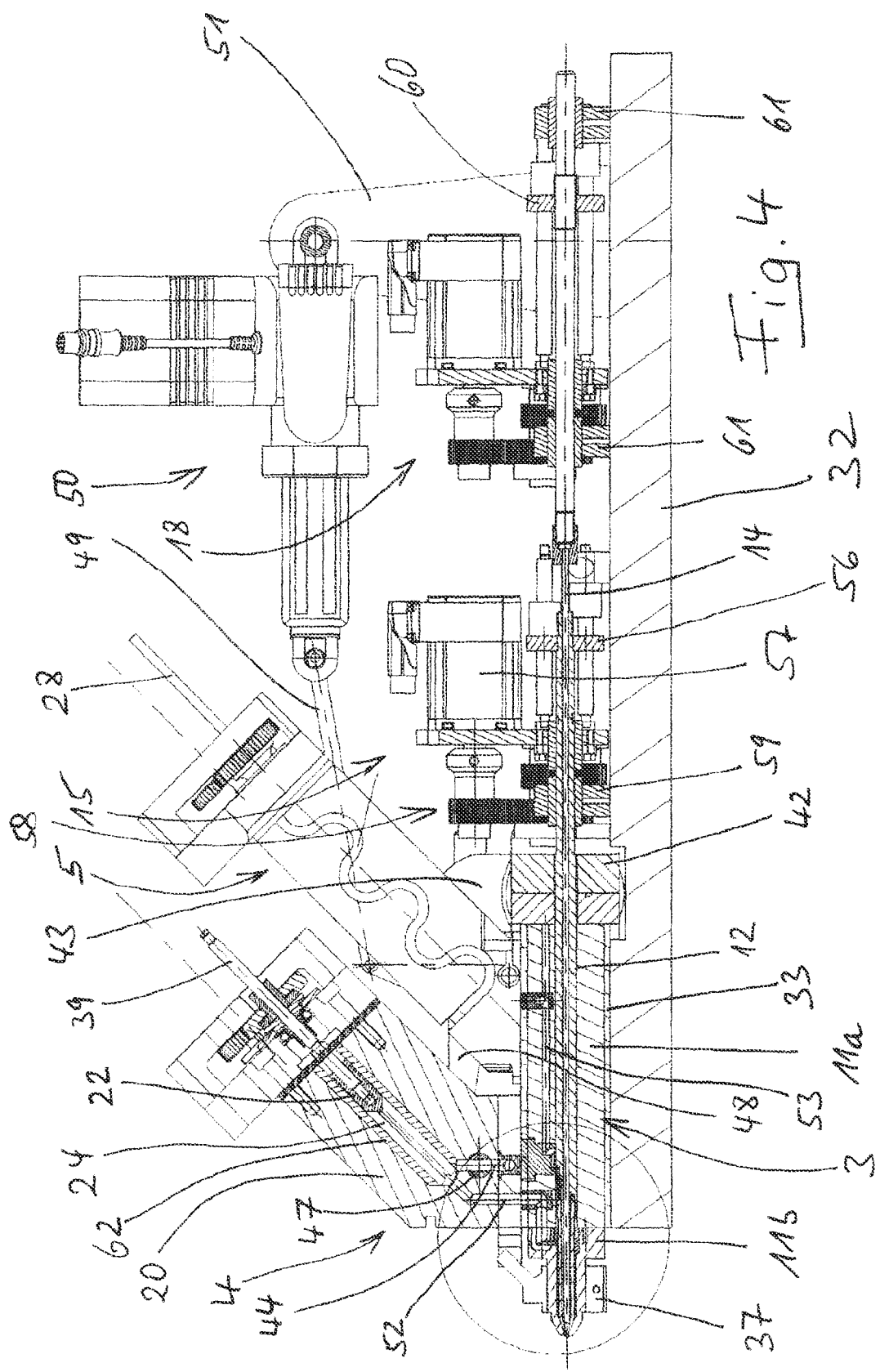
FIG. 4 shows a cutaway view, parallel to the longitudinal axis, of the injection-molding station according to FIGS. 2 and 3, partly along line IV-IV in FIG. 3.

Finally, in FIG. 4, it can be seen that first melt accumulators 4 respectively comprise a reducing sleeve 62, which is inserted (exchangeably) in cylinder housing 20 and in which piston 22 of melt accumulator 4 in question is guided sealingly and which together with the latter bounds the actual melt chamber 24. By replacing reducing sleeve 62 (and piston 22 adapted thereto) by a pair having a different piston diameter, the volume of the melt chamber is adapted to the amount of melt needed for one shot. The situation is analogous for the two second melt accumulators 5.

What is claimed is:

1. An injection-molding station for the manufacture of multilayer preforms comprising:
   an injection-molding machine (2) having at least one injection-molding cavity (1); at least one multi-component nozzle (3);
   at least two melt accumulators (4, 5) connected thereto;
   at least two plasticizer units (6, 7) for charging them;

a control unit (8); and actuators (15, 18) that can be activated independently of one another by the control unit (8), wherein the at least one multi-component nozzle (3) is constructed as a shutoff nozzle with at least two melt channels (9, 10) disposed concentrically relative to one another, at least in portions, connected to the melt accumulators (4, 5) and merging with one another inside the at least one multi-component nozzle and with two closing slides (17, 19), which can be separately activated, associated therewith;

wherein the actuators (15, 18) act on the slides (17, 19) in such a way that the melt channels (9, 10) respectively have an infinitely variable passage cross section;

wherein the melt accumulators (4, 5) are constructed as cylinder accumulators with a proportional actuator (26, 27) that is associated with the respective piston (22, 23) and can be activated by the control unit (8);

wherein the control unit (8) comprises a memory unit for coordinated movement or position profiles of the at least two closing slides (17, 19) and the at least two melt-accumulator pistons (22, 23);

wherein the drives of the plasticizing units (6, 7), the actuators (15, 18) of the closing slides (17, 19) and the proportional actuators (26, 27) of the melt-accumulator pistons (22, 23) are of electromechanical construction;

wherein the closing slides (17, 19) are constructed as shutoff needles (13, 14) disposed concentrically relative to one another wherein a first of the shutoff needles is constructed as a hollow needle (12); and wherein both the outside and inside of the hollow needle (12) adjacent to the nozzle mouth (54) taper toward the mouth.

2. The injection-molding station of claim 1, wherein the injection-molding machine (2) is constructed as a multi-cavity injection-molding machine, wherein each injection-molding cavity is provided with its own multi-component nozzle (3).

3. The injection-molding station of claim 2, wherein each melt accumulator (4, 5) is connected to a maximum of eight multi-component nozzles (3).

4. The injection-molding station of claim 1, wherein the actuators (15, 18) associated with the closing slides (17, 19) respectively comprise a differential mechanism (58).

5. The injection-molding station of claim 1, wherein at least one of the entry apertures through which melt from the melt accumulators (4, 5) passes into the melt channels (9, 10) is disposed close to the confluence of the melt channels.

6. The injection-molding station of claim 1, wherein the melt channels merge directly upstream from or at the mouth (54) of the multi-component nozzle (3).

7. The injection-molding station of claim 1, wherein the melt accumulators (4, 5) respectively comprise a reducing sleeve (62), which is inserted exchangeably in a housing (20, 21) of the melt accumulator and in which the piston (22, 23) of the melt accumulator in question is sealingly guided.

8. The injection-molding station according to claim 1, wherein the variable passage cross section of a first melt channel (9) is disposed between the hollow needle (12) and the nozzle housing (11) and the variable passage cross section of a second melt channel (10) is disposed between the hollow needle (12) and the second shutoff needle (14) disposed inside this.

9. The injection-molding station of claim 1, characterized in that the shutoff needle disposed inside the hollow needle (12) adjacent to the nozzle mouth (54) tapers toward this and ends substantially as a sharp point (55).

10. The injection-molding station of claim 1, wherein the melt accumulators (4, 5) are thermally decoupled from one another.

11. The injection-molding station of claim 1, wherein time-position-movement profiles of the at least two closing slides (17, 19) and of the at least two melt-accumulator pistons (22, 23) are resident in the memory unit of the control unit (8).

12. The injection-molding station of claim 1, wherein the movement profiles resident in the memory unit are independent of melt pressure.

13. An injection blow-molding machine for the manufacture of hollow articles having a multilayer wall structure, comprising an injection-molding station of claim 1, a transfer unit and a blowing station with a blow-molding machine having at least one blowing cavity as well as a blowing-gas source.

* * * * *